United States Patent
Lapierre

(10) Patent No.: US 12,359,756 B2
(45) Date of Patent: Jul. 15, 2025

(54) CONNECTING ASSEMBLY FOR CONNECTING HOSE SEGMENTS TOGETHER, AND MAPLE TREE SAP HARVESTING SYSTEM PROVIDED WITH THE SAME

(71) Applicant: LES EQUIPEMENTS LAPIERRE INC., St-Ludger (CA)

(72) Inventor: Donald Lapierre, St-Ludger (CA)

(73) Assignee: LES EQUIPEMENTS LAPIERRE INC, Quebec (CA)

( * ) Notice: Subject to any disclaimer, the term of this patent is extended or adjusted under 35 U.S.C. 154(b) by 0 days.

(21) Appl. No.: 17/119,654

(22) Filed: Dec. 11, 2020

(65) Prior Publication Data

US 2021/0180735 A1     Jun. 17, 2021

Related U.S. Application Data

(60) Provisional application No. 62/946,744, filed on Dec. 11, 2019.

(51) Int. Cl.
*F16L 33/207* (2006.01)
*A01G 23/10* (2006.01)
(Continued)

(52) U.S. Cl.
CPC ......... *F16L 33/2076* (2013.01); *F16L 33/225* (2013.01); *F16L 37/04* (2013.01); *A01G 23/10* (2013.01)

(58) Field of Classification Search
CPC ..... A01G 23/14; F16L 33/2076; F16L 33/225
See application file for complete search history.

(56) References Cited

U.S. PATENT DOCUMENTS 3,560,028 A * 2/1971 Manabu .................. F16L 37/05
                                                           285/332.2
4,321,911 A * 3/1982 Offutt ..................... F24S 80/30
                                                           285/124.1
(Continued)

FOREIGN PATENT DOCUMENTS

EP           1215433 A1 * 6/2002 ............ F16L 33/225
FR           1535688 A  * 6/1967
(Continued)

OTHER PUBLICATIONS

EP-1215433 Translation, Buerli Kurt, Jun. 19, 2002 (Year: 2002).*

*Primary Examiner* — Zachary T Dragicevich
*Assistant Examiner* — Alexander T Rufrano
(74) *Attorney, Agent, or Firm* — Merchant & Gould P.C.

(57) ABSTRACT

A connecting assembly for operatively and fluidly connecting at least first and second hose segments together. The connecting assembly includes at least one insert portion, and corresponding bulge(s), securing device(s) and fluid passage (s). The securing device is removably mounted onto and displaceable about a portion of a given length span of the insert portion, and configured for operation between a first release mode, where the securing device being is drawn away from the bulge and thus an extremity of the hosing segment is releasable, and a second connecting mode, where the securing device is removably and selectively displaced over an outward overlapping of the extremity of the hosing segment extending over the bulge, so as to securely maintain said extremity of the hosing segment in place, operatively against the bulge and thus, prevent the first extremity of the first hosing segment from being removed from the bulge.

18 Claims, 8 Drawing Sheets

(51) Int. Cl.
*F16L 33/22* (2006.01)
*F16L 37/04* (2006.01)

(56) References Cited

U.S. PATENT DOCUMENTS

| | | | | |
|---|---|---|---|---|
| 4,366,648 A | * | 1/1983 | Morin | A01G 23/10 47/52 |
| 4,537,183 A | * | 8/1985 | Fogarty | A61F 2/26 128/DIG. 25 |
| 4,750,764 A | * | 6/1988 | Gibellina | F16L 37/138 285/908 |
| 4,790,569 A | * | 12/1988 | Chaffee | F16L 33/225 285/40 |
| 4,946,200 A | * | 8/1990 | Blenkush | F16L 33/225 285/38 |
| 5,135,267 A | * | 8/1992 | Wilson | F16L 33/2076 285/259 |
| 5,303,504 A | * | 4/1994 | Buzzell | A01G 23/14 285/133.11 |
| 5,388,870 A | * | 2/1995 | Bartholomew | F16L 33/225 29/451 |
| 6,003,906 A | * | 12/1999 | Fogarty | F16L 33/225 285/242 |
| 6,231,085 B1 | * | 5/2001 | Olson | F16L 33/24 29/451 |
| 6,641,177 B1 | * | 11/2003 | Pinciaro | F16L 37/0985 285/257 |
| 7,163,238 B1 | * | 1/2007 | Mittersteiner | F16L 33/225 285/259 |
| 9,772,057 B2 | * | 9/2017 | Keren | F16L 37/04 |

FOREIGN PATENT DOCUMENTS

| | | | | |
|---|---|---|---|---|
| GB | 2130325 A | * | 5/1984 | .......... F16L 33/2076 |
| WO | WO-2007049053 A1 | * | 5/2007 | .......... F16L 33/225 |

* cited by examiner

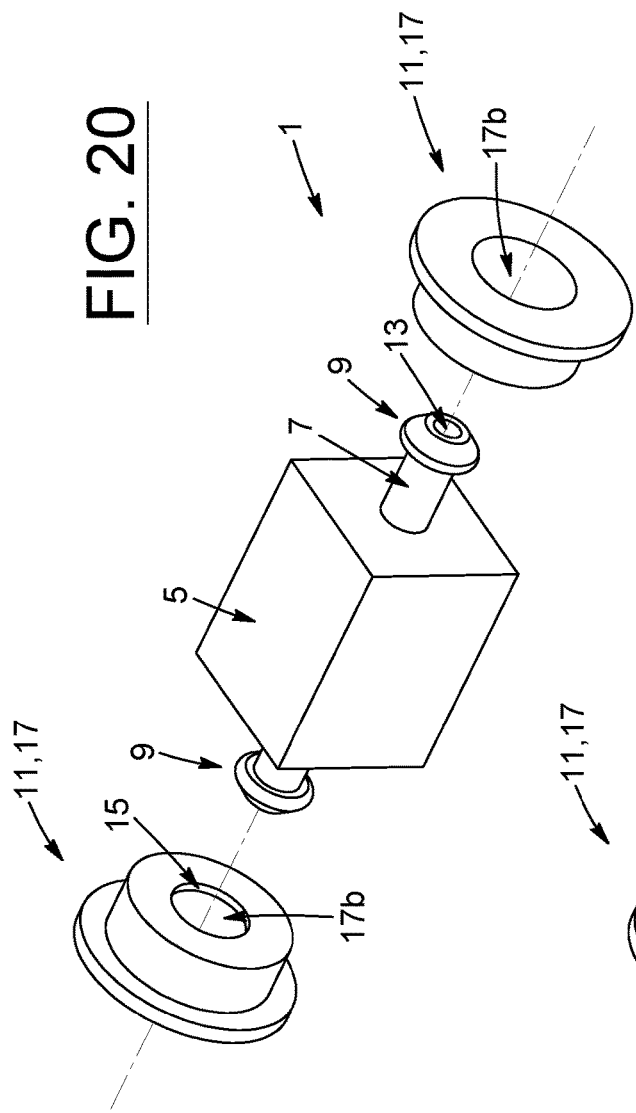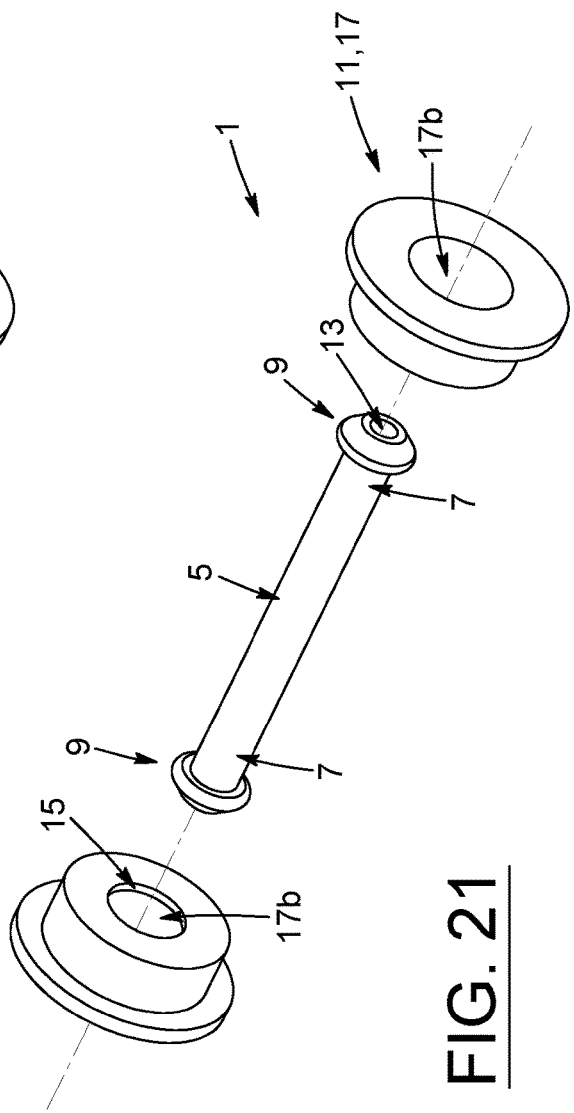

CONNECTING ASSEMBLY FOR CONNECTING HOSE SEGMENTS TOGETHER, AND MAPLE TREE SAP HARVESTING SYSTEM PROVIDED WITH THE SAME

The present patent application claims priority of U.S. provisional patent application No. 62/946,744 dated Dec. 11, 2019, the content of which is incorporated herein by reference.

FIELD OF THE INVENTION

The present invention relates to the field of harvesting sap for the production of syrup, such as maple syrup, for example, and/or any other type of syrup. More particularly, the present invention relates to a connecting assembly (referred to also herein as a "quick connector") for easily, quickly and tightly connecting hose segments together within a maple tree sap harvesting system, for example, and also relates to a kit with corresponding components for assembling the same, and to corresponding methods of manufacturing, assembling and/or operating associated thereto.

BACKGROUND

Known in the art are the various drawbacks associated with the traditional way of connecting hose segments together, within a maple tree sap harvesting system (for instance), that relies on a network of corresponding hoses for collecting the sap. For example, special tooling and specialized workers are required, and the process of using barb connectors, such as the one exemplified in FIG. 1, is quite long, tedious and costly, considering that a given land of maple trees relying on such a harvesting system will often have several hundreds, if not, several thousands of trees, and thus, a corresponding number of hoses and connectors being required. Furthermore, because of the inherent nature of the design of the "barb connector" itself, which is primarily designed to aggressively and plastically deform the hose segment upon extraction, via its corresponding barbs (i.e. fishhooks and/or other sharp arrows, which make extraction extremely difficult, etc.), such hose segments are often damaged, and the connectors themselves can also typically break when it is time to "dismantle" the harvesting system, during the off-season, which further translates into additional drawbacks and inconveniences (namely, added costs and time to repair and/or replace damage/broken pieces, etc.).

Consequently, it would be greatly advantageous to find a new way of connecting hose segments together, within a maple tree sap harvesting system, for example, and to be able to do so in a quicker, simpler, more precise, more efficient, more economical, more reliable, more adjustable, more versatile, more adaptable, more durable, more environmentally conscientious, more desirable, and/or improved manner, than what is possible with the actual way of doing things.

SUMMARY OF THE INVENTION

An object of the present invention is to provide a connecting assembly which, by virtue of its design and components, would be an improvement over other related conventional connecting devices and/or methods known in the prior art.

In accordance with the present invention, the above object is achieved, as will be easily understood from the present description, with a connecting assembly (also referred to herein simply as a "quick connector") such as the one briefly described herein and such as the one exemplified in the accompanying drawing(s).

More particularly, according to one aspect of the present invention, an object is to provide a connecting assembly for operatively and fluidly connecting at least first and second hose segments together, the connecting assembly comprising:
  a main body;
  at least one insert portion extending from the main body and being removably insertable into an inner diameter of a first extremity of the first hosing segment, the at least one insert portion having a given length span, and having a first end insertable into said first extremity of the first hosing segment, and an opposite second end;
  at least one bulge provided about the first end of the at least one insert portion, said at least one bulge being positioned, shaped and sized for abutting against an inner wall of the inner diameter of the first extremity of the first hosing segment, and for allowing an outward overlapping of said first extremity of the first hosing segment over the at least one bulge;
  at least one securing device being positioned, shaped and sized for removably mounting onto a portion of the given length span of the at least one insert portion, the at least one securing device being further positioned, shaped and sized for displacement along said given length span of the at least one insert portion and for operation between a first mode known as a release mode, where the at least one securing device is drawn away from the at least one bulge and thus the first extremity of the first hosing segment is allowed to be removed from said at least one bulge, and a second mode known as a connecting mode, where the at least one securing device is removably and selectively displaceable over the outward overlapping of the first extremity of the first hosing segment extending over the at least one bulge, so as to securely maintain said first extremity of the first hosing segment in place, operatively against the at least one bulge and thus, prevent the first extremity of the first hosing segment from being removed from said at least one bulge; and
  at least one fluid passage extending through the at least one insert portion, and the at least one bulge, for operatively and fluidly connecting the inner diameter of the first extremity of the first hosing segment to a corresponding inner diameter of a second extremity of the second hosing segment when the at least one securing device is operated in the second mode.

According to another aspect of the invention, there is also provided a harvesting system for harvesting sap from a plurality of maple trees, the harvesting system comprising a network of hose segments being operatively to one another via at least one of the above-mentioned connecting assembly.

For example, and according to a possible embodiment, there is provided a harvesting system for harvesting sap from a plurality of maple trees, the harvesting system comprising:
  a network of hose segments being operatively to one another, and being fluidly connected between corresponding taps of the maple trees to be harvested for sap, and a centralized collecting center;

a vacuum device operatively connectable to the network of hose segments for drawing sap harvested from the corresponding taps of the maple trees towards the centralized collecting center; and at least one connecting assembly such as the one described and/or illustrated in the present patent specification, and provided about the network of hose segments for operatively and fluidly connecting at least first and second hose segments together, for allowing sap to flow from the corresponding taps of the maple trees to be harvested to the centralized collecting center.

According to yet another aspect of the invention, there is also provided a method of manufacturing components of the above-mentioned connecting assembly and/or harvesting system.

According to yet another aspect of the invention, there is also provided a method of assembling components of the above-mentioned connecting assembly and/or harvesting system.

According to yet another aspect of the invention, there is also provided a method of using the above-mentioned connecting assembly, harvesting system and/or component(s) thereof.

According to yet another aspect of the invention, there is also provided a kit with components for assembling the above-mentioned connecting assembly and/or harvesting system.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of harvesting sap from trees with the above-mentioned connecting assembly, harvesting system, component(s) thereof, kit, set and/or method(s).

According to yet another aspect of the present invention, there is also provided a method of doing business with the above-mentioned connecting assembly, harvesting system, component(s) thereof, kit, set and/or method(s).

The objects, advantages, and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 20 is a top perspective view of a connection assembly according to yet another possible embodiment of the present invention, the connecting assembly being shown with first and second securing devices displayed in an exploded relationship with respect to a main body and corresponding insert portions of the connecting assembly.

FIG. 21 is a top perspective view of a connection assembly according to yet another possible embodiment of the present invention, the connecting assembly being shown with first and second securing devices displayed in an exploded relationship with respect to a main body and corresponding insert portions of the connecting assembly.

DETAILED DESCRIPTION OF PREFERRED EMBODIMENTS OF THE INVENTION

Figure 1:
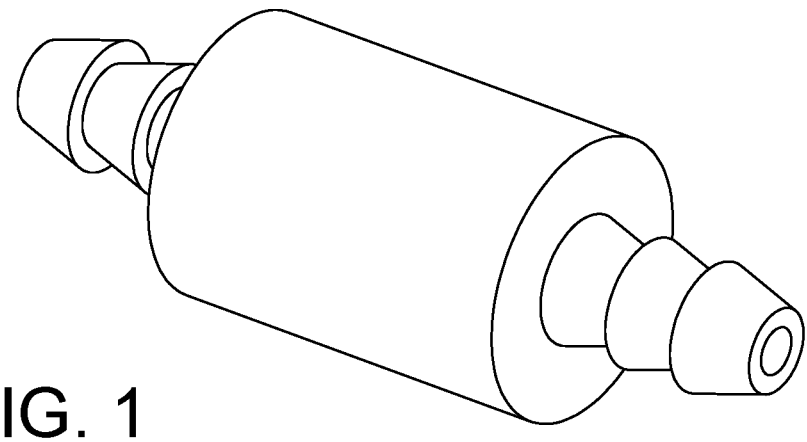
FIG. 1 is a top perspective view of a barb connector used for connecting hose segments together according to the prior art.
Figure 2:
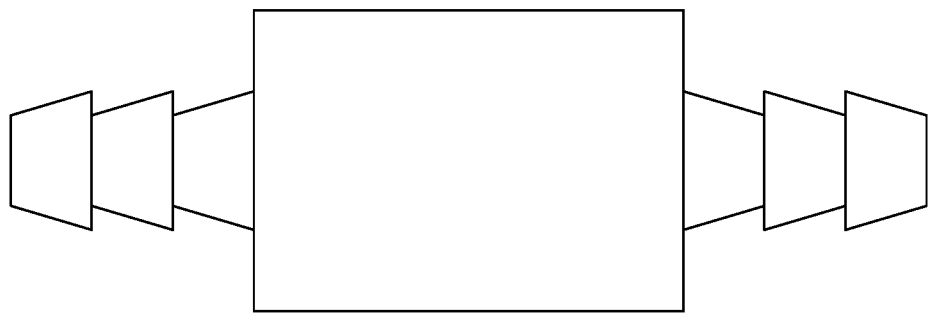
FIG. 2 is a side view of what is shown in FIG. 1.
Figure 3:
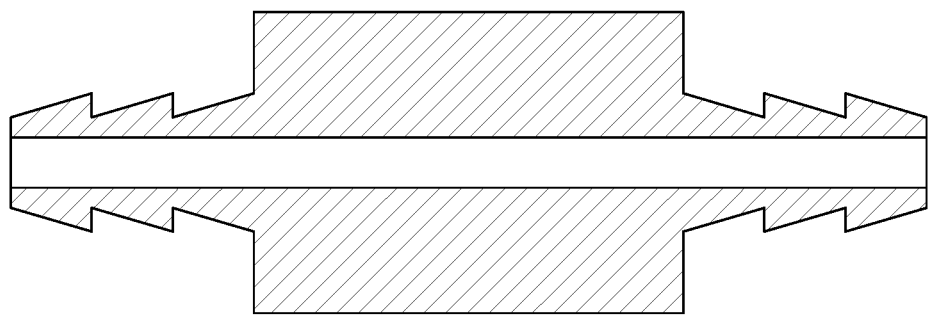
FIG. 3 is a cross-sectional view of what is shown in FIG. 2.

In the following description, the same numerical references refer to similar elements. Furthermore, for sake of simplicity and clarity, namely, so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions shown in the figures are preferred, for exemplification purposes only.

Moreover, although the present invention was primarily designed for connecting hose segments together within a maple tree sap harvesting system, for example, it may be used with other objects and/or in other types of applications, as apparent to a person skilled in the art. For this reason, expressions such as "connecting", "hose", "segment(s)", "maple", "tree", "sap", "harvesting", "system", etc., used herein should not be taken so as to limit the scope of the present invention and include all other kinds of objects and/or applications with which the present invention could be used and may be useful. For example, the present connecting assembly could also be used with and/or for various other types of "hose" and/or "tubular" products (ex. tubing, piping, plumbing, hydraulics, etc.) for instance, as can be easily understood by a person skilled in the art.

Moreover, in the context of the present invention, the expressions "connecting assembly", "connector", "assembly", "device", "system", "fitting", "apparatus", "product", "unit", "equipment", "method" and "kit", as well as any other equivalent expression(s) and/or compound word(s) thereof known in the art will be used interchangeably, as apparent to a person skilled in the art. This applies also for any other mutually equivalent expressions, such as, for example: a) "connecting", "fastening", "securing", "affixing", "maintain in place", "locking", etc.; b) "hose", "segment", "tube", "tubing", "pipe", "conduit", "passage", etc.; c) "harvesting", "relaying", "conveying", "collecting", "retrieving", etc.; d) "sap", "fluid", "liquid", "product", etc.; e) "mode", "configuration", "state", etc.; f) "release", "free", "disconnected", "unlocked", "detached", etc.; g) "connected", "secured", "closed", "locked", "fastened", etc.; h) "hole", "orifice", "through-hole", etc.; as well as for any other mutually equivalent expressions, pertaining to the aforementioned expressions and/or to any other structural and/or functional aspects of the present invention, as also apparent to a person skilled in the art. Also, in the context of the present description, expressions such as "can", "may", "might", "will", "could", "should", "would", etc., may also be used interchangeably, whenever appropriate, as also apparent to a person skilled in the art.

Furthermore, in the context of the present description, it will be considered that all elongated objects will have an implicit "longitudinal axis" or "centerline", such as the longitudinal axis of a tube, for example, or the centerline of a coiled spring, for example, and that expressions such as "connected" and "connectable", or "mounted" and "mountable", or even "displaced" and "displaceable", may be interchangeable, in that the present invention also relates to a kit with corresponding components for assembling a resulting fully-assembled and fully-operational connecting assembly.

Moreover, components of the present system(s) and/or steps of the method(s) described herein could be modified, simplified, altered, omitted and/or interchanged, without departing from the scope of the present invention, depending on the particular application(s) which the present invention is intended for, and the desired end result(s), as briefly exemplified herein and as also apparent to a person skilled in the art.

In addition, although the preferred embodiments of the present invention as illustrated in the accompanying drawings comprise various components, and although the preferred embodiments of the present connecting assembly and corresponding portion(s)/part(s)/component(s) as shown consist of certain geometrical configurations, as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperations therebetween, as well as other suitable geometrical configurations may be used for the present connecting assembly and corresponding portion(s)/part(s)/component(s) according to the present invention, as will be briefly explained herein and as can be easily inferred here from by a person skilled in the art, without departing from the scope of the present invention.

LIST OF NUMERICAL REFERENCES FOR SOME OF THE CORRESPONDING POSSIBLE COMPONENTS ILLUSTRATED IN THE ACCOMPANYING DRAWINGS 1. connecting assembly (ex. "quick connector")
3. hose segment
5. main body
7. insert portion
7a. first end (of insert portion)
7b. second end (of insert portion)
7c. given length span (of insert portion)
9. bulge
9a. frontward portion (of bulge)
9b. rearward portion (of bulge)
9c. tapered insertion portion (of bulge)
9d. rounded portion (of bulge)
9e. apex portion (of bulge—ex. in contact with hose segment)
11. securing device (ex. securing ring)
13. fluid passage
15. retaining component (ex. rim)
17. securing ring
17a. inner surface (of securing ring)
17b. though-hole (of securing ring)
17c. rim (of securing ring)
17d. flange (of securing ring)
$D_1$. maximal outer span (ex. outer diameter) (of $1^{st}$ bulge)
$D_2$. maximal outer span (ex. outer diameter) (of $2^{nd}$ bulge)
   ($D_2$ being equal and/or different (ex. bigger or smaller) to $D_1$ depending on possible embodiments of the connecting assembly)
$d_1$. inner diameter (of $1^{st}$ bulge)
$d_2$. inner diameter (of $2^{nd}$ bulge)
   ($d_2$ being equal and/or different (ex. bigger or smaller) to $d_1$ depending on possible embodiments of the connecting assembly)
$d_T$. inner diameter (of hose segment or "tube")
$\Omega$. deviation angle (of angled inner surface of securing ring)
$\Omega_1$. deviation angle (of angled inner surface of first securing ring)
$\Omega_2$. deviation angle (of angled inner surface of second securing ring)
   ($\Omega_2$ being equal and/or different (ex. bigger or smaller) to $\Omega_1$ depending on possible embodiments of the connecting assembly)
$d_T$. inner diameter (of hose segment or "tube")
$\theta$. separation angle (ex. in general, between a pair of insertions portions)
$\theta_1$. separation angle (ex. between $1^{st}$ and $2^{nd}$ insert portions)
$\theta_2$. separation angle (ex. between $2^{nd}$ and $3^{rd}$ insert portions)

$\theta_3$. separation angle (ex. between $3^{rd}$ and $4^{th}$ insert portions)

$\theta_4$. separation angle (ex. between $4^{th}$ and $1^{st}$ insert portions)

Broadly described, and as better exemplified in the accompanying drawings, the present invention relates to a connecting assembly (1) (referred to also herein as a "quick connector") that allows an easy, quick and tight connection of hose segments (3) together (i.e. the hose segments (3) are operatively and fluidly connected to one another, in a very simple and effective way, via the present connecting assembly (1)), within a maple tree sap harvesting system, for example, with the added advantage that disconnection of the hose segments (3) is also done in a very simple, quick and effortless manner (namely, without special tooling being required, etc.), thanks to the components and features of the present connecting assembly (1), and also, without damaging the hose segments (3) (nor during insertion nor during extraction, etc.).

The present connecting assembly (1) may come in the form of a connecting assembly (1) including one and/or several of the following possible components and features (and/or different possible combination(s) and/or permutation(s) thereof):

Indeed, and as can be easily understood when referring to the accompanying drawings, there is provided a connecting assembly (1) for operatively and fluidly connecting at least first and second hose segments (3) together. The connecting assembly (1) comprises a main body (5), which may come in various shapes and forms, as will be explained in greater detail hereinbelow, and also comprises at least one insert portion (7) extending from the main body (5) and being removably insertable into an inner diameter of a first extremity of the first hose segment (3), the at least one insert portion (7) having a given length span (7c), and having a first end (7a) insertable into said first extremity of the first hose segment (3), and an opposite second end (7b). As can be easily understood from the accompanying drawings, the at least one insert portion (7) may be considered "separate" from the main body (5) and/or may be considered as "being part" thereof, depending on the particular embodiment(s) of the connecting assembly (1) being used.

The connecting assembly (1) may also comprise at least one bulge (9) provided about the first end (7a) of the at least one insert portion (7), said at least one bulge (9) being positioned, shaped and sized for abutting against an inner wall of the inner diameter of the first extremity of the first hose segment (3), and for allowing an outward overlapping of said first extremity of the first hose segment (3) over the at least one bulge (9), as can be easily understood from the accompanying figures.

The connecting assembly (1) may also comprise at least one securing device (11) being positioned, shaped and sized for removably mounting onto a portion of the given length span (7c) of the at least one insert portion (7), the at least one securing device (11) being further positioned, shaped and sized for displacement along said given length span (7c) of the at least one insert portion (7) and for operation between a first mode known as a "release" mode, where the at least one securing device (11) is drawn away from the at least one bulge (9) and thus the first extremity of the first hose segment (3) is "allowed" to be removed from said at least one bulge (9), and a second mode known as a "connecting" mode, where the at least one securing device (11) is removably and selectively displaceable over the outward overlapping of the first extremity of the first hose segment (3) extending over the at least one bulge (9), so as to securely maintain said first extremity of the first hose segment (3) in place, operatively against the at least one bulge (9) and thus, "prevent" (i.e. impede, made difficult, etc.) the first extremity of the first hose segment (3) from being removed from said at least one bulge (9), as can be easily understood from the accompanying figures.

The connecting assembly (1) may also comprise at least one fluid passage (13) extending through the at least one insert portion (7), and the at least one bulge (9), for operatively and fluidly connecting the inner diameter of the first extremity of the first hose segment to a corresponding inner diameter of a second extremity of the second hose segment (3) when the at least one securing device (11) is operated in the second mode.

According to a possible embodiment, as exemplified in the accompanying drawings, the at least one bulge (9) may comprise a tapered insertion portion (9c), extending between frontward and rearward portions (9a, 9b). The frontward portion (9a) of the at least one bulge (9) may include a front face, which may be part of a front annulus of the frontward portion (9a) of the at least one bulge (9), for example. Similarly, the rearward portion (9b) of the at least one bulge (9) may include a rear face, which may be part of a rear annulus of the rearward portion (9b) of the at least one bulge (9), for example.

According to another possible embodiment, the at least one bulge (9) may comprise a substantially rounded portion (9d) extending between the tapered insertion portion (9c) and the rearward portion (9b), and similarly, the at least one bulge (9) may comprise a substantially rounded portion (9d) extending between the tapered insertion portion (9c) and the frontward portion (9a).

As can be easily understood by a person skilled in the art, the at least one bulge (9) is meant to have a maximal outer span being substantially "similar" to the inner diameter of the first extremity of the first hose segment (3) to be mounted onto said at least one bulge (9), but according to a preferred possible embodiment, and as exemplified in the accompanying figures, the at least one bulge (9) is advantageously made to have a maximal outer span being "equal or greater" than the inner diameter of the first extremity of the first hose segment (3) to be mounted onto said at least one bulge (9), for improved "tightness" between hose segment (3) and bulge (9), thus, for avoiding and/or reducing any possible leakage, etc.

According to a possible embodiment, the first hose segment (3) is made of a substantially elastic material so that the first extremity of said first hose segment (3) is deformable when inserted over the at least one bulge (9). As way of example only, the first hose segment (3) may be made of "polyvinyl chloride" (PVC), for instance, although various other types of suitable materials may be possible and are contemplated by the present system, depending on the particular application(s) for which the connecting assembly (1) is intended for, and/or the desired end result(s), as apparent to a person skilled in the art.

According to other possible embodiments, as exemplified in the accompanying drawings, the at least one insert portion (7) has a substantially cylindrical outer body, and also has a substantially cylindrical inner diameter, and the inner diameter of the at least one insert portion (7) is smaller than the inner diameter of the first extremity of the first hose segment (3) to be mounted onto the at least one bulge (9), although various other suitable geometrical dispositions and/or configurations may be possible and are contemplated by the present system.

Referring now to the at least one securing device (11), it worth mentioning that it may include a retaining component (15) for retaining the at least one securing device (11) about the at least one insert portion (7) when the at least one securing device (11) is mounted over the at least one bulge (9) and onto the given length span (7c) of the at least one insert portion (7), namely, so as to conveniently avoid having the at least one securing device (11) falling off the connecting assembly (1), etc.

According to a possible embodiment, the at least one securing device (11) may include a securing ring (17) having an inner surface (17a) being positioned, shaped and sized so as to securely maintain the first extremity of the first hose segment (3) in place, operatively against the at least one bulge (9), when the securing ring (17) is displaced along the at least one insert portion (7) towards the second mode of the at least one securing device (11) known as the "connecting" mode.

As exemplified in the accompanying drawings, the inner surface (17a) of the securing ring (17) may be an angled inner surface (17a), said angled inner surface (17a) extending at a deviation angle (Ω) with respect to a longitudinal axis of the at least one insert portion (7) (ex. between about 12 degrees and about 18 degrees, for example—if employed with a typical ⅜" diameter hose segment as used in the maple sap harvesting industry), and being positioned, shaped and sized so as to progressively and increasingly "constrict" (ex. "squeeze", "grip", etc.) the first extremity of the first hose segment (3) in place, operatively against the at least one bulge (9), by progressively reducing a spacing between said angled inner surface (17a) of the securing ring (17) and an apex portion (9e) of the at least one bulge (9).

Namely, the "more" the securing ring (17) is displaced over the outward overlapping of the first extremity of the first hose segment (3) extending over the at least one bulge (9), so as to securely maintain said first extremity of the first hose segment (3) in place, operatively against the at least one bulge (9), the "tighter" the securement becomes, thereby, making it "harder" for the first extremity of the first hose segment (3) to be removed from said at least one bulge (9). Thus, the present connecting assembly (1) is not only capable of operation between first and second modes (i.e. between the "release" mode and the "connecting" mode), but also, along a third mode, known as a "tightening" mode, which is anything past and/or beyond the second mode, etc.—i.e. further compression and tightening of the hose segment (3), etc.), as can be easily understood by a person skilled in the art. According to a possible embodiment, the distance of travel of the securing ring (17) is made to be proportional to a diameter of the hose segment (3), and an optimal deviation angle (Ω) to be used with the present connecting assembly (1) may vary depending on certain parameters (ex. diameter of hose segment, thickness of hose segment, desired distance of travel for operating the securing ring (17) between first and second modes, etc.), as can also be easily understood by a person skilled in the art.

According to another possible embodiment, the securing ring (17) may include a through-hole (17b) being positioned, shaped and sized for allowing passage of the at least one bulge (9) through said through-hole (17b) when the securing ring (17) is mounted over the at least one bulge (9) and onto the given length span (7c) of the at least one insert portion (7), as can be easily understood when referring to the accompanying drawings.

Optionally, the securing ring (17) may be made of a substantially elastic material so that its through-hole (17b) is resiliently deformable when passed over the at least one bulge (9). As way of example only, the securing ring (17) may be made of nylon and/or polycarbonate, for instance, although various other types of suitable materials may be possible and are contemplated by the present system, depending on the particular application(s) for which the connecting assembly (1) is intended for, and/or the desired end result(s), as apparent to a person skilled in the art.

Optionally also, the securing ring (17) may include a rim (17c) being positioned, shaped and sized for abutting against a rearward portion (9b) of the at least one bulge (9) when the securing ring (17) is mounted over the at least one bulge (9) and onto the given length span (7c) of the at least one insert portion (7). The rim (17c) may simply be a rearward rim (17c) defined about a corresponding inner recess of the securing ring (17), for example. This particular embodiment is a clever way of providing a retaining component (15) for retaining the at least one securing device (11), so as to avoid the securing ring (17) from falling off the connecting assembly (1) when mounted over the at least one bulge (9) and onto the given length span (7c) of the at least one insert portion (7). Various other suitable embodiments, geometrical dispositions and/or configurations, as well as various other suitable mechanical equivalents, may be possible and are also contemplated by the present system.

For example, and according to another embodiment (not shown), an inner portion of the securing ring (17) could be provided with threading being complementary to and engageable with corresponding threading provided about the given length span (7c) of the at least one insert portion (7), so as to not only act as a "retaining component" (15), but also, allow a displacement of the securing ring (17) along the given length span (7c) of the at least one insert portion (7), and onto the outward overlapping of the first extremity of the first hose segment (3) extending over the at least one bulge (9), so as to securely maintain said first extremity of the first hose segment (3) in place, operatively against the at least one bulge (9) (ex. when the securing ring (17) is operated into the second mode known as the "connecting" mode).

As can be easily understood from the accompanying drawings, and according to a possible embodiment, the securing ring (17) may be provided with at least one outwardly-projecting flange (17d), for facilitating manual handling, and operating of the at least one securing device (11) between the first and second modes (i.e. between the "release" mode and the "connecting" mode). Optionally, the at least one outwardly-projecting flange (17d) may define a disk operatively extending about an outer body of the securing ring (17), for example. Optionally also, the outer body of the securing ring (17) may be substantially cylindrical, as illustrated via the examples shown in the accompanying figures, although various other suitable geometrical dispositions and/or configurations may be possible and are contemplated by the present system.

Similarly, and as can be easily understood when referring to the accompanying drawings, the main body (5) of the connecting assembly (1) may come in various shapes and forms, depending on the particular application(s) for which the connecting assembly (1) is intended for, and/or the desired end result(s), as apparent to a person skilled in the art.

For example, the main body (5) of the connecting assembly (1) may have an outer cross-sectional profile which is polygonal with a corresponding number of sides. In the case where the outer cross-sectional profile of the main body (5) has 3 sides, the main body (5) of the connecting assembly (1) would thus have a "triangular" outer body (5). In the case where the outer cross-sectional profile of the main body (5)

would have 4 sides, the main body (5) of the connecting assembly (1) would thus have a "rectangular" outer body (5), and should the outer cross-sectional profile of the main body (5) has 4 equal sides, then the main body (5) of the connecting assembly (1) would thus be a "square" outer body (5), as shown in FIG. 20, for example. According to another and extremely simplified possible embodiment, the main body (5) of the connecting assembly (1) could simply consist of the insert portion(s) involved, as exemplified in FIG. 21, for instance.

Optionally, the main body (5) of the connecting assembly (1) is substantially cylindrical, and according to a possible embodiment, the main body (5) of the connecting assembly (1) includes a shouldering portion (5a) for abutting against the at least one securing device (11) when mounted onto the given length span (7c) of the at least one insert portion (7), and also, for allowing a greater and/or more ergonomic gripping of the main body (5) when operating the securing ring (17) between the first and second modes (i.e. between the "release" mode and the "connecting" mode). As can be easily understood when referring to the accompanying drawings, the shouldering portion (5a) of the main body (5) may include an abutment surface, and the abutment surface may be part of an abutment annulus of the shouldering portion (5a) of the main body (5), for example.

Several modification(s), alteration(s), addition(s) and/or simplification(s) could be made to the present connecting assembly (1), depending on the intended purpose(s) and/or desired result(s), without departing from the scope of the present invention, as can be easily understood by a person skilled in the art.

Indeed, as can also be easily understood by a person skilled in the art, when referring to the accompanying drawings, and as previously explained on different occasions, various suitable geometrical dispositions and/or configurations may be possible and are contemplated by the present system. For example, the at least one insert portion (7) may include n corresponding insert portions (7), with n being an integer greater than 1, and thus, wherein the at least one bulge (9) includes n corresponding bulges (9), and wherein the at least one securing device (11) includes n corresponding securing devices (11).

Indeed, and as exemplified in the accompanying drawings, the connecting assembly (1) may include a plurality of insert portions (7), with associated bulges (9) and securing devices (11), each insert portion (7) having an inner fluid passage (13) with corresponding longitudinal axis extending at a separation angle ($\theta$) with respect to a neighboring insert portion (7) having an inner fluid passage (13) with corresponding longitudinal axis.

Figure 13:
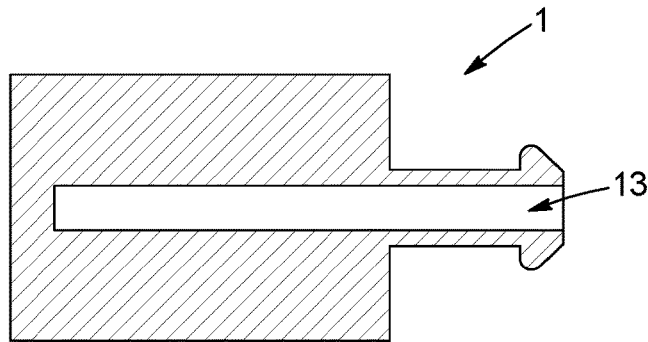
FIGS. 13-16 are cross-sectional views of connecting assemblies having main bodies and associated insert portion(s) and bulge(s), according to different possible embodiments of the present invention.
Figure 14:
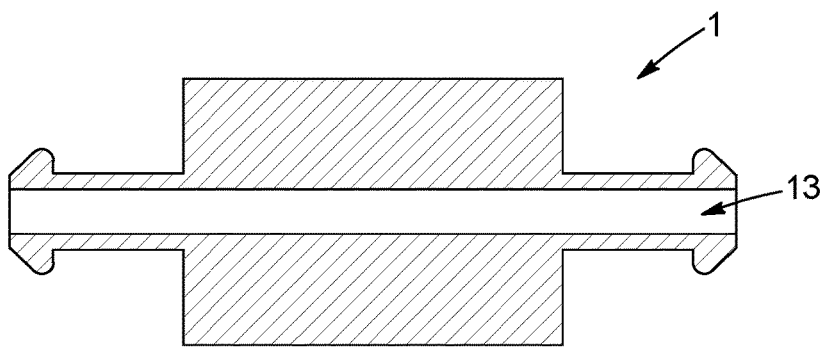
Figure 15:
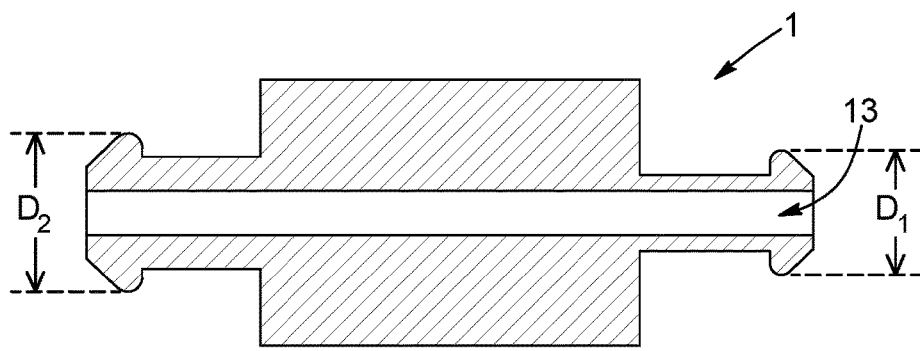
Figure 16:
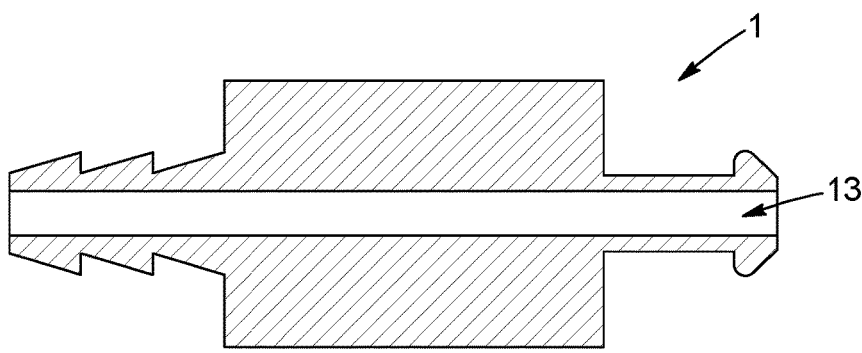

The separation angle ($\theta$) may be between about 0 and about 180 degrees. For instance, in the examples illustrated in FIGS. 4-12, 14 and 15, these could be interpreted as being connecting assemblies (1) each having first and second insert portions (7) and associated bulges (9), and having a separation angle ($\theta$) of 180 degrees between "neighboring" insert portions (7). In the example of FIG. 13, this could be interpreted as being a connecting assembly (1) with one "single" insert portion (7), and/or alternatively, this could also be interpreted as a "pair" of insert portions (7) and associated bulges (9), being identical and geometrically "overlapping" one another, and having a separation angle ($\theta$) of 0 degrees between "neighboring" insert portions (7), and to be used with "first" and "second" hose segments (3) which are actually "one single" hose segment (3). Either way, the embodiment exemplified in FIG. 13 illustrates that the present connecting assembly (1) could also be used as an "end cap" for a given hose segment (3).

Similarly to the above-discussed, the separation angle ($\theta$) between "neighboring" insert portions (7) could be between about 45 and about 135 degrees, for example, and optionally also, the separation angle ($\theta$) could simply be about 90 degrees, for example.

Figure 17:
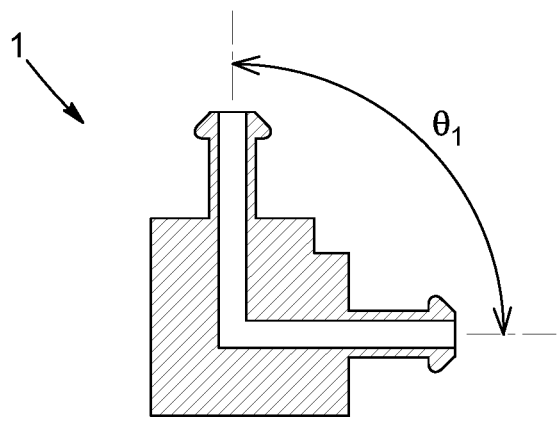
FIGS. 17-19 are cross-sectional views of yet other connecting assemblies having main bodies and associated insert portion(s) and bulge(s), according to different possible embodiments of the present invention.
Figure 18:
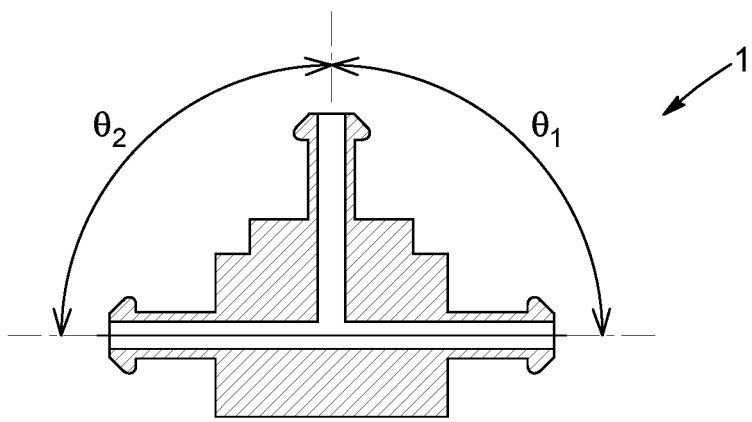
Figure 19:
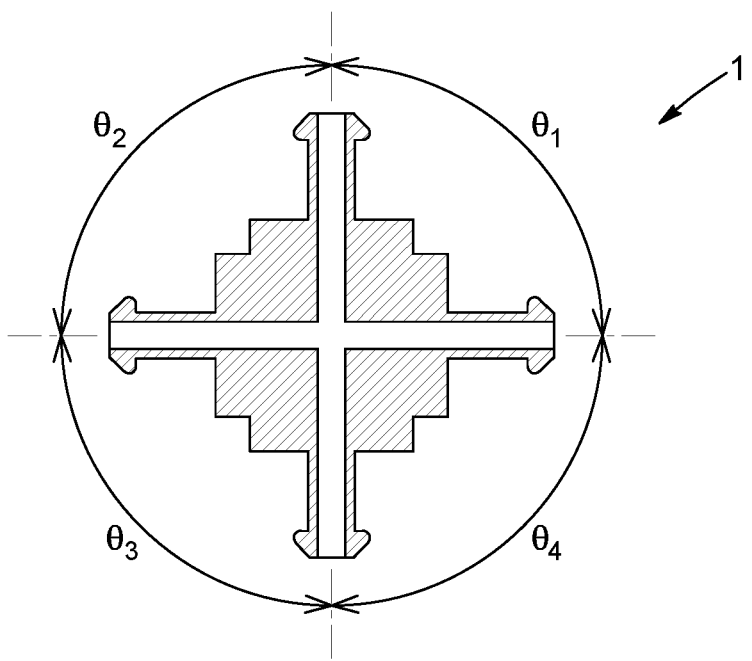

It is worth mentioning that the separation angles ($\theta_1$, $\theta_2$, $\theta_3$, $\theta_4$, etc.) between "neighboring" insert portions (7) could be different, and/or the same, as exemplified in FIGS. 17-19, and/or a combination of both, as can be easily understood by a person skilled in the art. Similarly, each longitudinal axis of each inner fluid passage (13) of each insert portion (7) may lie within a same and common imaginary plane of the connecting assembly (1), and/or alternatively, at least one corresponding insertion portion (7) may extend beyond a plane defined by each longitudinal axis of each inner fluid passage (13) of other remaining insert portions (7), and/or a combination of both, as can also be easily understood by a person skilled in the art.

Figure 4:
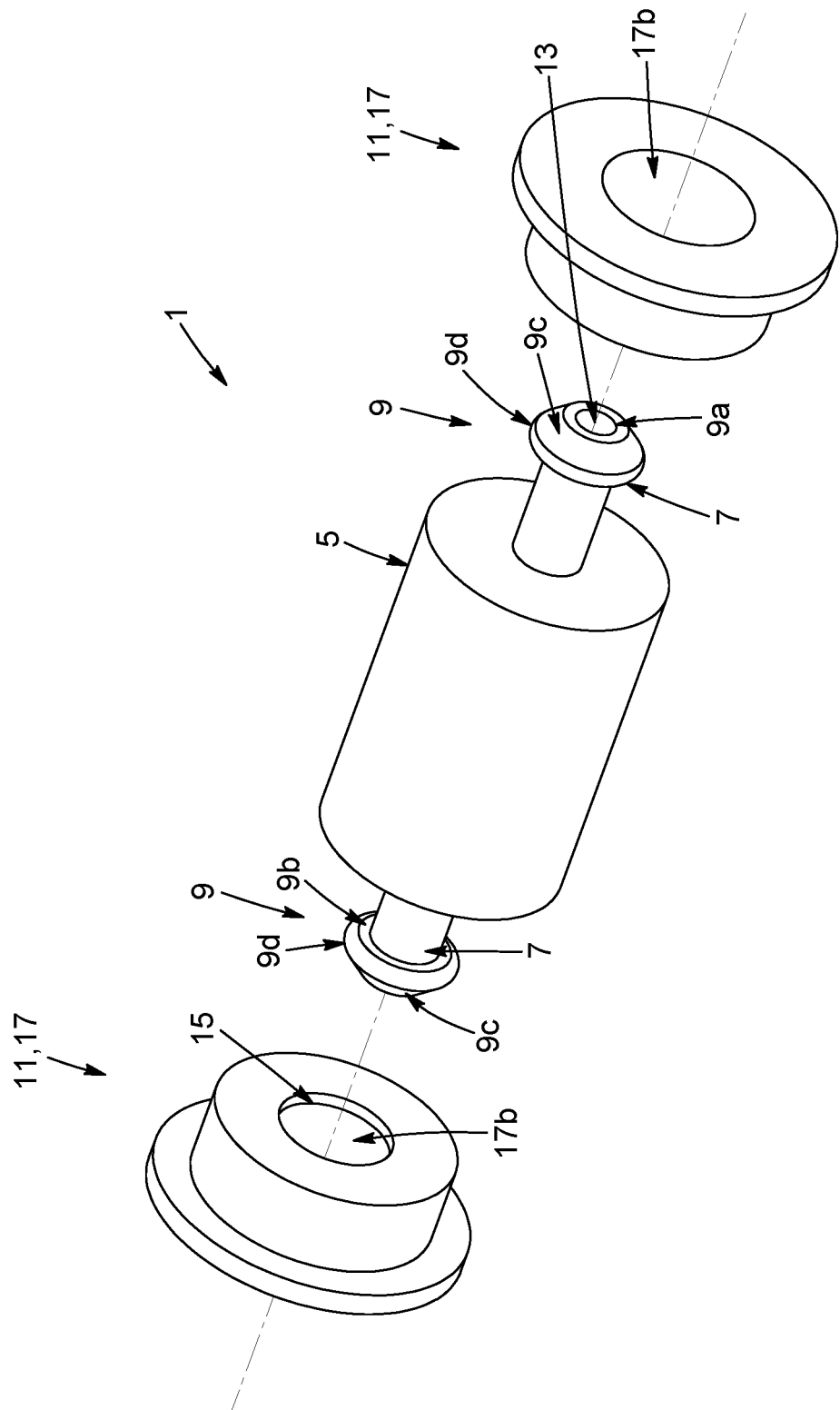
FIG. 4 is a top perspective view of a connection assembly according to a possible embodiment of the present invention, the connecting assembly being shown with first and second securing devices displayed in an exploded relationship with respect to a main body and corresponding insert portions of the connecting assembly.
Figure 5:
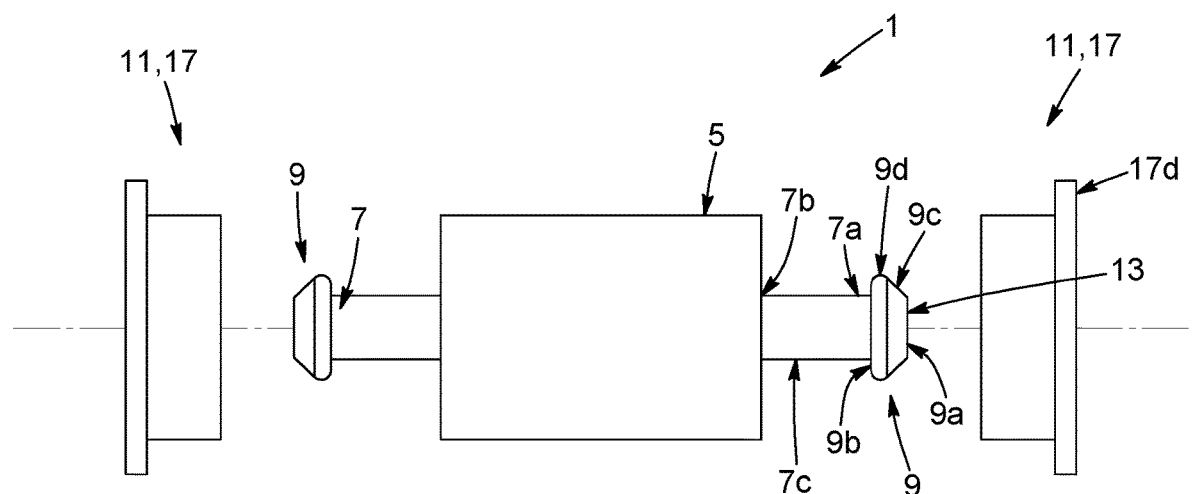
FIG. 5 is a side view of what is shown in FIG. 4.
Figure 6:
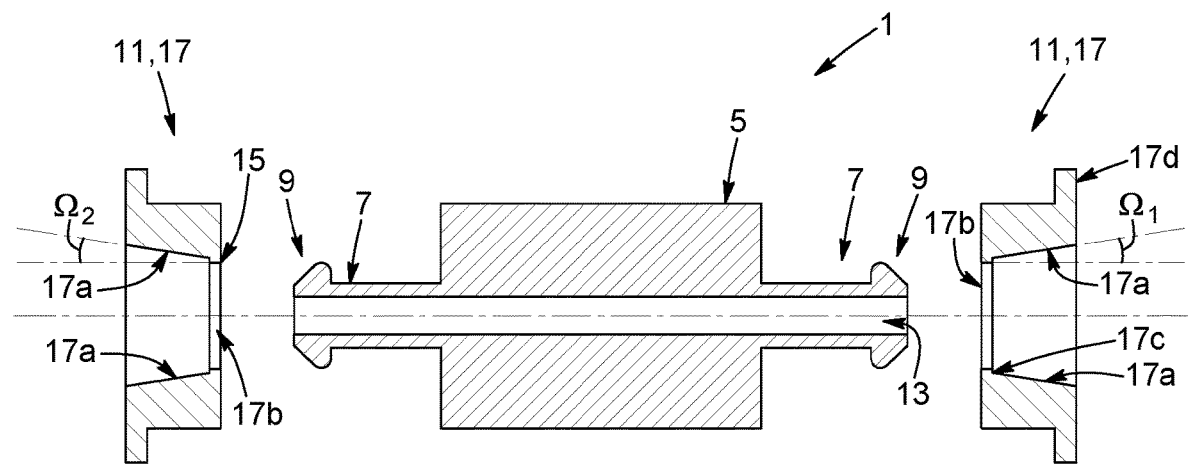
FIG. 6 is a cross-sectional view of what is shown in FIG. 4.
Figure 7:
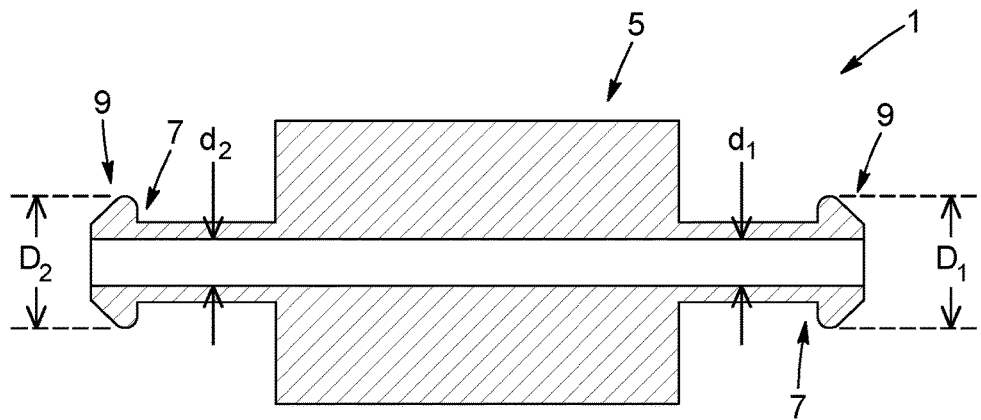
FIG. 7 is a cross-sectional view of a main body of a connecting assembly provided with first and second insert portions, and associated bulges, according to a possible embodiment of the present invention.
Figure 8:
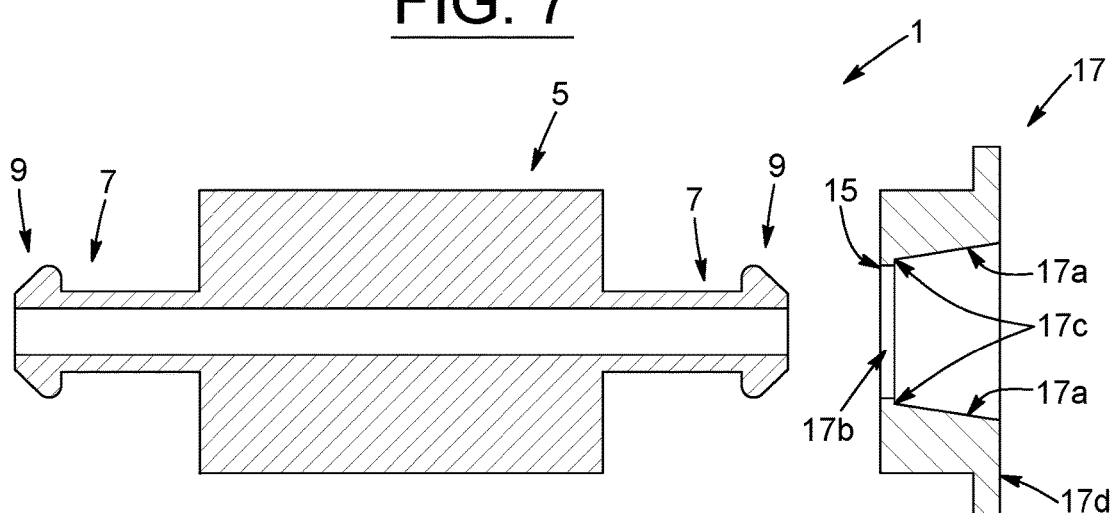
FIG. 8 is another view of what is shown in FIG. 7, the connecting assembly being now shown with a securing device displayed in an exploded relationship with respect to one side of the main body and its corresponding insert portion and associated bulge.
Figure 9:
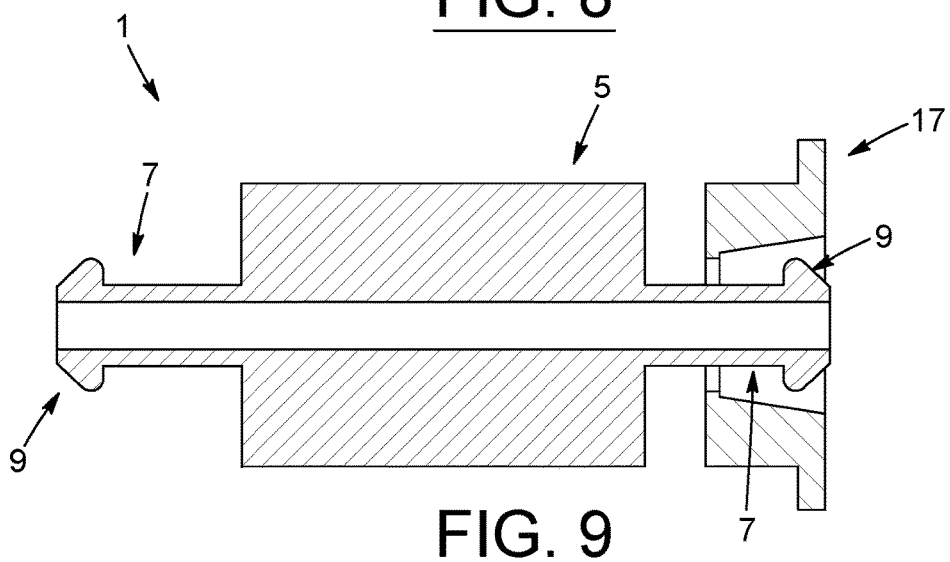
FIG. 9 is another view of what is shown in FIG. 8, the connecting assembly being now shown with the securing device being mounted onto and being displaceable about a portion of a given length span of the insert portion.
Figure 10:
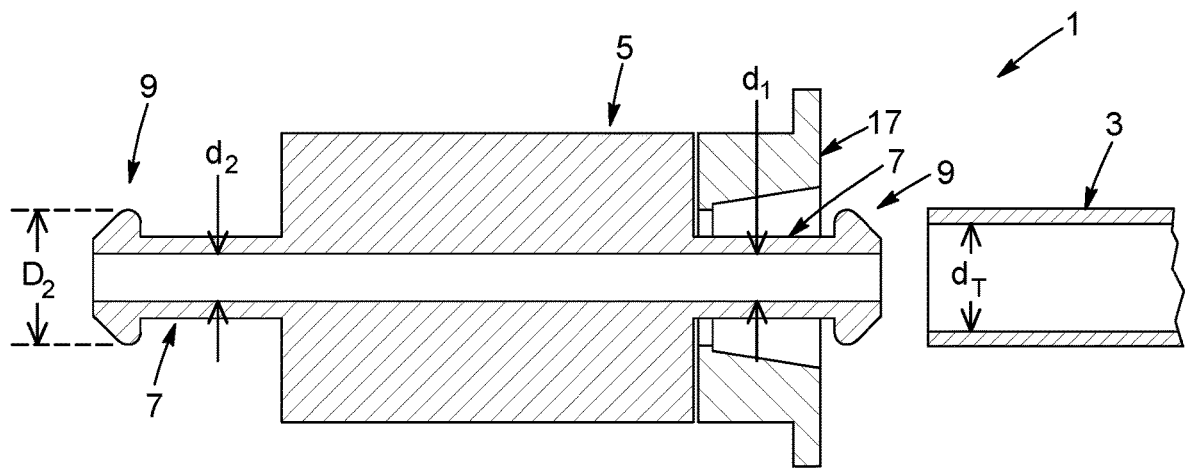
FIG. 10 is another view of what is shown in FIG. 9, the connecting assembly being now shown with the securing device being displaced against a shouldering portion of the main body of the connecting assembly, and being further shown with an extremity of a hose segment displayed in an exploded relationship with respect to the corresponding insert portion and associated bulge.
Figure 11:
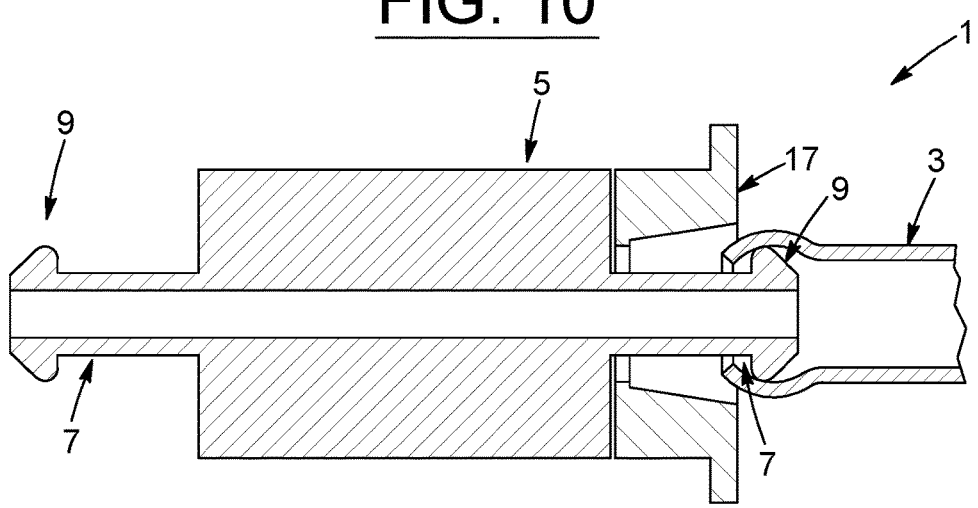
FIG. 11 is another view of what is shown in FIG. 10, the connecting assembly being now shown the bulge introduced into the extremity of the hose segment, and abutting against an inner wall of the inner diameter of the hose segment, so as to allow an outward overlapping of said extremity of the hose segment over the bulge.
Figure 12:
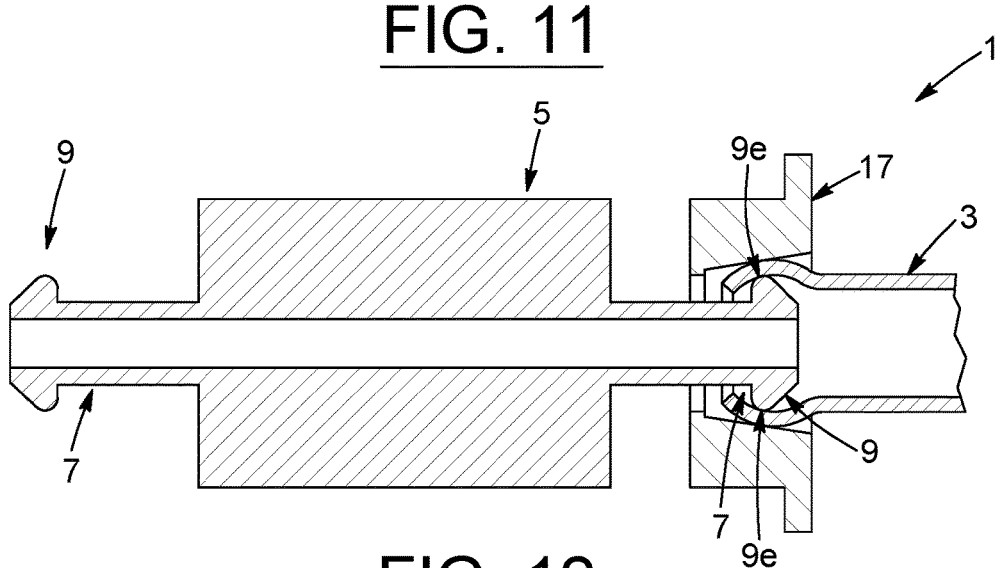
FIG. 12 is another view of what is shown in FIG. 11, the connecting assembly being now shown with the securing device being removably and selectively displaced over the outward overlapping of the extremity of the hose segment extending over the bulge, so as to securely maintain said extremity of the hose segment in place, operatively against the bulge and thus, prevent the extremity of the hose segment from being removed from the bulge, and thus, from the connecting assembly.

According to a simplified and very versatile embodiment, the connecting assembly (1) includes first and second insert portions (7), with associated bulges (9) and securing devices (11), the first and second insert portions (7) sharing a common inner fluid passage (13) extending along a longitudinal axis of the connecting assembly (1), as exemplified in FIGS. 4-6, for instance.

Alternatively, the connecting assembly (1) may include at least first, second and third insert portions (7), with associated bulges (9) and securing devices (11), each insert portion (7) having an inner fluid passage (13) with corresponding longitudinal axis, and wherein at least one corresponding insertion portion (7) of the at least first, second and third insert portions (7) extends beyond a plane defined by each longitudinal axis of each inner fluid passage (13) of other remaining insert portions (7). According to a particularly embodiment, said at least first, second and third insert portions (7) may be mutually orthogonal (ex. each being "perpendicular", that is, at 90 degrees, with respect to each other, etc.).

Several other modification(s), alteration(s), addition(s) and/or simplification(s) could be made to the present connecting assembly (1), depending on the intended purpose(s) and/or desired result(s), without departing from the scope of the present invention, as can be easily understood by a person skilled in the art.

For example, it is worth mentioning that the connecting assembly (1) may be provided with different types of information and/or instructions in order to assist a user of said connecting assembly (1), with the operational steps thereof. For example, the main body (5) of the connecting assembly (1) may be provided with visual indications (ex. wording, symbols, etc.) for indicating to a user of the connecting assembly (1) how to operate the securing device 11 (ex. securing ring (17) and/or a directional sense of the first and second modes, although another important advantage of the design of present connecting assembly (1) and corresponding components, is that operation thereof is fairly "self-evident" and very "user-friendly" (namely, no special tooling is required, but rather, the simple use of one's hands and/or fingers, in order to "push" and/or "pull" on the securing ring (17), etc.).

According to another aspect of the present invention, there is provided also a kit with corresponding components for assembling a connecting assembly (1) according to what has been described and/or illustrated in the present patent specification. The connecting assembly (1) may also comprise a mounting component (and/or kit) for mounting (ex. either securely, fixedly, temporarily, adjustably, etc.) the connecting assembly (1) (and/or corresponding components thereof, such as the main body (5), for example) onto a given structure (ex. wall, railing, post, tree, etc.), via suitable hardware, such as bolt(s), rivet(s), fastener(s), etc., if need may be.

Other possible aspect(s), object(s), embodiment(s), variant(s), and/or resulting advantage(s) of the present connecting assembly (1), all being preferred and/or optional, are briefly explained hereinbelow, and can be easily understood and/or inferred from the accompanying drawings, as well.

For example, according to another aspect of the present invention, there is also provided a harvesting system for harvesting sap from a plurality of maple trees. The harvesting system may comprise a network (ex. array, distribution, etc.) of hose segments (3) being operatively to one another, and being fluidly connected between corresponding taps of the maple trees to be harvested for sap, and a centralized collecting center, as is well known. The harvesting system may also comprise a vacuum device operatively connectable to the network of hose segments (3) for drawing sap harvested from the corresponding taps of the maple trees towards the centralized collecting center, as is also well known. As can be easily understood by a person skilled in the art, the vacuum device could ultimately be avoided, and the collecting of sap via the network of hose segments (3) could be done using the effect of "gravity", depending on how the hose segments (3) are disposed, etc. However, having and using some sort of suction and/or pumping device (ex. vacuum device, etc.) is usually more advantageous. Advantageously also, the harvesting system may comprise at least one connecting assembly (1) such as the one(s) described and/or illustrated in the present patent specification, said at least one connecting assembly (1) being provided about the network of hose segments (3) for operatively and fluidly connecting at least first and second hose segments (3) together, for allowing sap to flow from the corresponding taps of the maple trees to be harvested to the centralized collecting center via the network of hose segments (3) and corresponding at least one connecting assembly (1).

As may now be better appreciated, the present connecting assembly (1) is a considerable improvement over conventional ways of connecting hose segments, within a maple tree sap harvesting system, for example. Indeed, the present system enables a new way of connecting hose segments together, and enables to do so in a quicker, simpler, more precise, more efficient, more economical, more reliable, more adjustable, more versatile, more adaptable, more durable, more environmentally conscientious, more desirable, and/or improved manner, than what is possible with the actual way of doing things, namely, when compared to barb connectors (see FIG. 1, for example).

Among other things, the present system allows an easy, quick and tight connection of hose segments (3) together (i.e. the hose segments (3) are operatively and fluidly connected to one another, in a very simple and effective way, via the present connecting assembly (1)), with the added advantage that disconnection of the hose segments (3) is also done in a very simple, quick and effortless manner (namely, without special tooling being required, etc.), thanks to the components and features of the present connecting assembly (1), as explained and discussed hereinabove, and as exemplified in the accompanying drawings, and also, with the added benefit that the use of the present connecting assembly (1) does not damage and/or break the hose segments (3) when disconnection takes place.

The innovative design of the present connecting assembly (1), and associated components and features, is also advantageous, in that, the present connecting assembly (1) can be used to progressively, increasingly and selectively select a level of "tightness" based on how much the at least one securing device (11) (ex. securing ring (17)) is removably and selectively displaceable over the outward overlapping of the first extremity of the first hose segment (3) extending over the at least one bulge (9), so as to securely maintain and "tighten" said first extremity of the first hose segment (3) in place, operatively against the at least one bulge (9) and thus, prevent the first extremity of the first hose segment (3) from being removed from said at least one bulge (9). The innovative design of the present connecting assembly (1), and associated components and features, including the at least one securing device (11) (ex. securing ring (17)), is also advantageous, in that, "pulling out" on the hosing segment (3) away from the connecting assembly (1) actually increases the "tightening" of the securing of the hose segment (3) in place, when the at least one securing device (11) (ex. securing ring (17)) is in its second mode, due to the very nature and design of the at least one securing device (11) (ex. securing ring (17)), namely, the presence of the angled inner surface and corresponding deviation angle ($\Omega$), etc. Finally, and as mentioned before, the present system is also advantageous in that use of the present connecting assembly (1) enables "multiple" and "repeated" uses, and does not damage and/or break the hose segments (3), nor during connection, nor when disconnecting (i.e. dismantling, etc.) takes place, something that is simply not possible with conventional "barb connectors".

The present connecting assembly (1) and corresponding parts are preferably made of substantially rigid materials, such as metallic materials, hardened polymers, composite materials, polymeric materials, and/or the like, so as to ensure a proper operation thereof depending on the particular applications for which the connecting assembly (1) is intended and the different parameters (weights, loads, moments, tightening forces, etc.) in cause, as apparent to a person skilled in the art. As way of example only, and according to a possible embodiment, the connecting assembly (1), and the different component(s) thereof (ex. main body (5), insert portion (7), bulge (9), securing ring (17), etc.) can be made of nylon and/or polycarbonate, for instance, which is light, resistant and well adapted for changes in temperature, and for north-American winter conditions, etc.

Of course, and as can be easily understood by a person skilled in the art, the scope of the claims should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims and as apparent to a person skilled in the art.

The invention claimed is:

1. A connecting assembly for operatively and fluidly connecting at least first and second hose segments together, the connecting assembly comprising:
   a main body;
   an insert portion extending from the main body and being removably insertable into an inner diameter of a first extremity of the first hosing segment, the insert portion having a given length span, and having a first end insertable into said first extremity of the first hosing segment, and an opposite second end;
   a bulge provided about the first end of the at least one-insert portion, said bulge being positioned, shaped and sized for abutting against an inner wall of the inner diameter of the first extremity of the first hosing segment, and for allowing an outward overlapping of said first extremity of the first hosing segment over the bulge;
   a securing device being positioned, shaped and sized for removably mounting onto a portion of the given length span of the insert portion, the securing device being further positioned, shaped and sized for displacement along said given length span of the insert portion and for operation between a first mode-known-as-a release mode, where the securing device is drawn away from the bulge and thus the first extremity of the first hosing segment is allowed to be removed from said bulge, and
   a connecting mode, where the securing device is removably and selectively displaceable over the outward overlapping of the first extremity of the first hosing segment extending over the bulge, so as to securely maintain said first extremity of the first hosing segment in place, operatively against the bulge and thus, prevent the first extremity of the first hosing segment from being removed from said bulge; and
   a fluid passage extending through the insert portion for operatively and fluidly connecting the inner diameter of the first extremity of the first hosing segment to a corresponding inner diameter of a second extremity of the second hosing segment when the securing device is operated in the connecting mode;
   wherein the bulge comprises a tapered insertion portion, extending between frontward and rearward portions of the bulge;
   wherein the frontward portion of the bulge includes a front face;
   wherein the front face is part of a front annulus of the frontward portion of the bulge;
   wherein the rearward portion of the bulge includes a rear face;
   wherein the rear face is part of a rear annulus of the rearward portion of the bulge;
   wherein the bulge comprises a substantially rounded portion extending between the tapered insertion portion and the rearward portion, and/or between the tapered insertion portion and the frontward portion;
   wherein the bulge has a maximal outer span being substantially equal or greater than the inner diameter of the first extremity of the first hosing segment to be mounted onto said bulge;
   wherein the securing device includes a securing ring having an inner surface being positioned, shaped and sized so as to securely maintain the first extremity of the first hosing segment in place, operatively against the bulge, when the securing ring is displaced along the insert portion towards the connecting mode of the securing device;
   wherein the inner surface of the securing ring is an angled inner surface, said angled inner surface extending at a deviation angle with respect to a longitudinal axis of the insert portion, and being positioned, shaped and sized so as to progressively and increasingly constrict the first extremity of the first hosing segment in place, operatively against the bulge, by progressively reducing a spacing between said angled inner surface of the securing ring and an apex portion of the bulge;
   wherein the deviation angle is between about 12 degrees and about 18 degrees;
   wherein the securing ring includes a through-hole being positioned, shaped and sized for allowing passage of the bulge through said through-hole when the securing ring is mounted over the bulge and onto the given length span of the insert portion;
   wherein the securing ring is made of a substantially elastic material so that its through-hole is resiliently deformable when passed over the bulge;
   wherein the securing ring includes a rim being positioned, shaped and sized for abutting against a rearward portion of the bulge when the securing ring is mounted over the bulge and onto the given length span of the insert portion;
   wherein the rim is a rearward rim defined about a corresponding inner recess of the securing ring;
   wherein the securing ring is provided with an outwardly-projecting flange, for facilitating manual handling, and operating of the securing device between the first-release and connecting modes;
   wherein the outwardly-projecting flange defines a disk operatively extending about an outer body of the securing ring;
   wherein the outer body of the securing ring is a substantially cylindrical;
   wherein the securing device includes a retaining component for retaining the securing device about the insert portion when the securing device is mounted over the bulge and onto the given length span of the insert portion; and
   wherein, when the securing device is in the release mode, the rear face of the rearward portion of the bulge is positioned along the longitudinal axis of the insert portion beyond the through-hole of the securing ring.

2. A connecting assembly according to claim 1, wherein the first hosing segment is made of a substantially elastic material so that the first extremity of said first hosing segment is deformable when inserted over the bulge.

3. A connecting assembly according to claim 2, wherein the insert portion has a substantially cylindrical outer body;
   wherein the insert portion has a substantially cylindrical inner diameter; and
   wherein the inner diameter of the insert portion is smaller than the inner diameter of the first extremity of the first hosing segment to be mounted onto the bulge.

4. A connecting assembly according to claim 1, wherein the main body of the connecting assembly has an outer cross-sectional profile which is polygonal with a corresponding number of sides, or alternatively, wherein the main body of the connecting assembly is substantially cylindrical.

5. A connecting assembly according to claim 4, wherein the main body of the connecting assembly includes a shouldering portion for abutting against the securing device when mounted onto the given length span of the insert portion;
   wherein the shouldering portion of the main body includes an abutment surface; and wherein the abutment surface is part of an abutment annulus of the shouldering portion of the main body.

6. A connecting assembly according to claim 5, wherein the insert portion includes n insert portions, with n being an integer greater than 1, and thus, wherein the bulge includes n corresponding bulges, and wherein the securing device includes n corresponding securing devices; and wherein the connecting assembly includes a plurality of insert portions, with associated bulges and securing devices, each insert portion having an inner fluid passage with a corresponding longitudinal axis extending at a separation angle with respect to a neighboring insert portion having an inner fluid passage with a corresponding longitudinal axis.

7. A connecting assembly according to claim 6, wherein each longitudinal axis of each inner fluid passage of each insert portion lies within a same and common plane of the connecting assembly.

8. A connecting assembly according to claim 6, wherein the connecting assembly includes first and second insert portions, with associated bulges and securing devices, the first and second insert portions sharing a common inner fluid passage extending along a longitudinal axis of the connecting assembly.

9. A connecting assembly according to claim 6, wherein the n insert portions includes first, second and third insert portions, and wherein at least one corresponding insertion portion of the first, second and third insert portions extends beyond a plane defined by each longitudinal axis of each inner fluid passage of other remaining insert portions.

10. A connecting assembly according to claim 9, wherein said first, second and third insert portions are mutually orthogonal.

11. A harvesting system for harvesting sap from a plurality of maple trees, the harvesting system comprising:
a network of hose segments being operatively connected to one another, and being fluidly connected between corresponding taps of the maple trees to be harvested for sap, and a centralized collecting center;
a vacuum device operatively connectable to the network of hose segments for drawing sap harvested from the corresponding taps of the maple trees towards the centralized collecting center; and
at least one connecting assembly according to claim 1, the at least one connecting assembly being provided about the network of hose segments for operatively and fluidly connecting at least first and second hose segments together, for allowing sap to flow from the corresponding taps of the maple trees to be harvested to the centralized collecting center.

12. A connecting assembly for operatively and fluidly connecting at least first and second hose segments together, the connecting assembly comprising:
a main body;
an insert portion extending from the main body and being removably insertable into an inner diameter of a first extremity of the first hosing segment, the insert portion having a given length span, and having a first end insertable into said first extremity of the first hosing segment, and an opposite second end;
a bulge provided about the first end of the insert portion, said bulge being positioned, shaped and sized for abutting against an inner wall of the inner diameter of the first extremity of the first hosing segment, and for allowing an outward overlapping of said first extremity of the first hosing segment over the bulge;
a securing device being positioned, shaped and sized for removably mounting onto a portion of the given length span of the insert portion, the securing device being further positioned, shaped and sized for displacement along said given length span of the insert portion and for operation between a release mode, where the securing device is drawn away from the bulge and thus the first extremity of the first hosing segment is allowed to be removed from said bulge, and a connecting mode, where the securing device is removably and selectively displaceable over the outward overlapping of the first extremity of the first hosing segment extending over the bulge, so as to securely maintain said first extremity of the first hosing segment in place, operatively against the bulge and thus, prevent the first extremity of the first hosing segment from being removed from said bulge; and
a fluid passage extending through the insert portion, and the bulge, for operatively and fluidly connecting the inner diameter of the first extremity of the first hosing segment to a corresponding inner diameter of a second extremity of the second hosing segment when the securing device is operated in the connecting mode;
wherein the bulge comprises a tapered insertion portion, extending between frontward and rearward portions;
wherein the frontward portion of the bulge includes a front face;
wherein the front face is part of a front annulus of the frontward portion of the bulge;
wherein the rearward portion of the bulge includes a rear face;
wherein the rear face is part of a rear annulus of the rearward portion of the bulge;
wherein the bulge comprises a substantially rounded portion extending between the tapered insertion portion and the rearward portion, and/or between the tapered insertion portion and the frontward portion;
wherein the bulge has a maximal outer span being substantially equal or greater than the inner diameter of the first extremity of the first hosing segment to be mounted onto said bulge;
wherein the first hosing segment is made of a substantially elastic material so that the first extremity of said first hosing segment is deformable when inserted over the bulge;
wherein the insert portion has a substantially cylindrical outer body;
wherein the insert portion has a substantially cylindrical inner diameter;
wherein the inner diameter of the insert portion is smaller than the inner diameter of the first extremity of the first hosing segment to be mounted onto the bulge;
wherein the securing device includes a retaining component for retaining the securing device about the insert portion when the securing device is mounted over the bulge and onto the given length span of the insert portion;
wherein the securing device includes a securing ring having an inner surface being positioned, shaped and sized so as to securely maintain the first extremity of the first hosing segment in place, operatively against the bulge, when the securing ring is displaced along the insert portion towards the connecting mode of the securing device; and
wherein the inner surface of the securing ring is an angled inner surface, said angled inner surface extending at a deviation angle with respect to a longitudinal axis of the insert portion, and being positioned, shaped and sized so as to progressively and increasingly constrict the first extremity of the first hosing segment in place, operatively against the bulge, by progressively reducing a spacing between said angled inner surface of the securing ring and an apex portion of the bulge;

wherein the securing ring includes a through-hole being positioned, shaped and sized for allowing passage of the bulge through said through-hole when the securing ring is mounted over the bulge and onto the given length span of the insert portion;

wherein the securing ring is made of a substantially elastic material so that its through-hole is resiliently deformable when passed over the bulge;

wherein the securing ring includes a rim being positioned, shaped and sized for abutting against a rearward portion of the bulge when the securing ring is mounted over the bulge and onto the given length span of the insert portion;

wherein the rim is a rearward rim defined about a corresponding inner recess of the securing ring;

wherein the securing ring is provided with an outwardly-projecting flange, for facilitating manual handling, and operating of the securing device between the release and connecting modes;

wherein the outwardly-projecting flange defines a disk operatively extending about an outer body of the securing ring;

wherein the outer body of the securing ring is substantially cylindrical; and wherein, when the securing device is in the release mode, the rear face of the rearward portion of the bulge is positioned along the longitudinal axis of the insert portion beyond the through-hole of the securing ring.

13. A connecting assembly according to claim 12, wherein the insert portion includes n insert portions, with n being an integer greater than 1, and thus, wherein the bulge includes n corresponding bulges, and wherein the securing device includes n corresponding securing devices;

wherein the connecting assembly includes a plurality of insert portions, with associated bulges and securing devices, each insert portion having an inner fluid passage with a corresponding longitudinal axis extending at a separation angle with respect to a neighboring insert portion having an inner fluid passage with corresponding longitudinal axis;

wherein each longitudinal axis of each inner fluid passage of each insert portion lies within a same and common imaginary plane of the connecting assembly;

wherein the connecting assembly includes first and second insert portions, with associated bulges and securing devices, the first and second insert portions sharing a common inner fluid passage extending along a longitudinal axis of the connecting assembly;

wherein the n insert portions includes first, second and third insert portions, and wherein at least one corresponding insertion portion of the first, second and third insert portions extends beyond a plane defined by each longitudinal axis of each inner fluid passage of other remaining insert portions; and wherein said first, second and third insert portions are mutually orthogonal.

14. A connecting assembly according to claim 12, wherein the main body of the connecting assembly includes a shouldering portion for abutting against the securing device when mounted onto the given length span of the insert portion.

15. A connecting assembly according to claim 14, wherein the shouldering portion of the main body includes an abutment surface.

16. A connecting assembly according to claim 15, wherein the abutment surface is part of an abutment annulus of the shouldering portion of the main body.

17. A connecting assembly according to claim 12, wherein the main body of the connecting assembly has an outer cross-sectional profile which is polygonal with a corresponding number of sides.

18. A connecting assembly according to claim 12, wherein the main body of the connecting assembly is substantially cylindrical.

* * * * *